April 4, 1961     H. H. CAMPBELL     2,978,264
SEAL
Filed Sept. 12, 1956
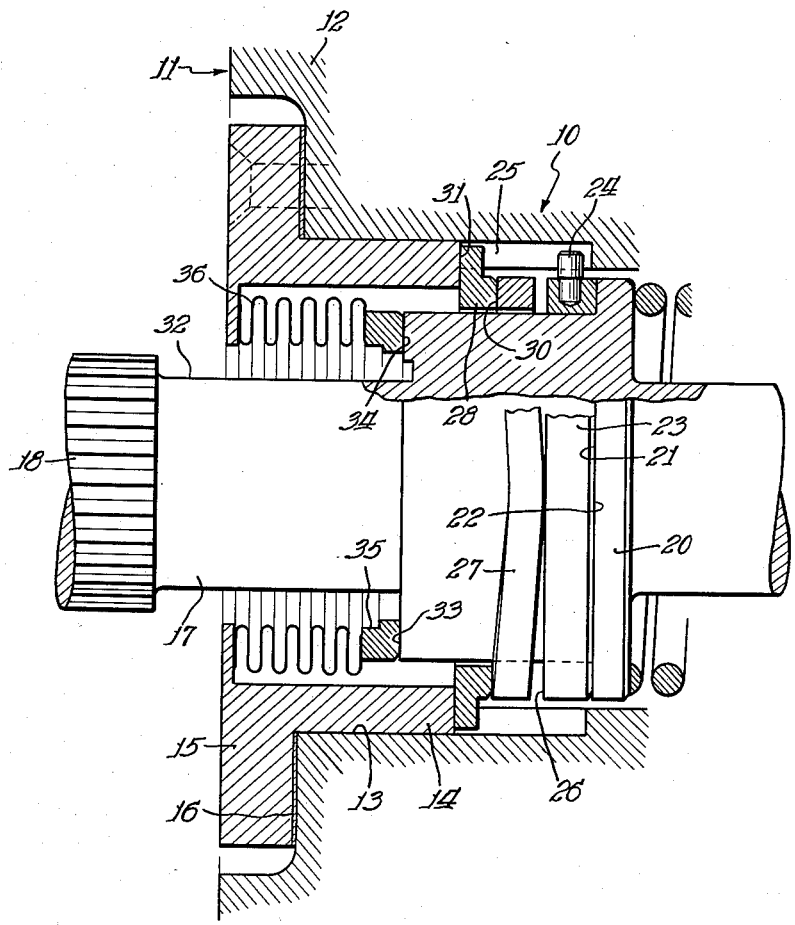
Inventor:
Henry H. Campbell
By: Joseph R Dwyer
Atty.

2,978,264
SEAL

Henry H. Campbell, East Cleveland, Ohio, assignor to Borg-Warner Corporation, Chicago, Ill., a corporation of Illinois Filed Sept. 12, 1956, Ser. No. 609,424

6 Claims. (Cl. 286—11)

This invention relates to rotary shaft seals and particularly to a sealing arrangement adapted for a drive shaft coupling for devices, such as, a fluid pump for the handling of high temperature fluids.

It is an object of this invention to provide a rotary shaft seal which provides a universal joint-like action as well as permitting the shaft to move axially within limits under normal operating conditions and which will permit the handling of high temperature fluids normally destructive to ordinary rotary shaft sealing arrangements.

Heretofore, it has been the practice to provide devices, such as pumps handling fluids under heretofore normal or low temperature conditions, with seals effective to permit a universal action as well as limited axial movement of the shaft. Such sealing arrangements, for example, are described and claimed in the U.S. patent to J. Roth No. 2,434,589 issued January 13, 1948. However, it has been found that sealing arrangements of this type while satisfactory under such pumping conditions, have been unsatisfatcory under present day high performance requirements where extremely high temperatures and non-corrosive materials are necessary.

It is therefore a principal object of my invention to provide an improvement over existing rotary shaft sealing arrangements which will permit its use in the handling of high temperature fluids.

I propose to accomplish this principal object of my invention by the provision of a rotary shaft seal for fluid handling devices, such as pumps, which utilizes a metallic sealing bellows and, while permitting universal rocker-like action and axial movement of the shaft, is relatively independent of any thrust loads during operation by such axial and universal movement. This relative freedom from thrust loads is accomplished by providing the sealing bellows with separate bearing surface means between the bellows and the rotary shaft and by providing another thrust load bearing surface means between the shaft and the housing of the pump. This arrangement facilitates the use of a metallic bellows, normally unusable under conditions requiring universal joint-like action as well as limited axial movement of the shaft, where conditions such as high temperature and corrosive agents in the fluid being handled prohibit the use of a rubber-like sealing diaphragm such as that disclosed in the Roth patent above identified.

Other and more important objects, advantages and uses of my invention will become apparent from the following specification taken in conjunction with the accompanying drawing which forms a part thereof and wherein there is shown a broken away axial, sectional, view of a rotary fluid pump incorporating a preferred embodiment of my invention.

Referring in greater detail to the drawing there is shown my sealing arrangement, indicated in its entirety by the numeral 10, incorporated in a pump, a portion of which is indicated in its entirety by numeral 11. Pump 11 comprises generally a housing 12 having a cylindrical bore 13 which receives a cylindrical portion 14 of a seal flange 15. Any suitable sealing means, such as, gasket 16 may be provided to prevent leakage between the housing 12 and the seal flange 15. Pump shaft 17 is splined at its left end as shown in the drawing at 18, for suitable coupling to a driving means (not shown) and is also provided with a radially extending, relatively thin flange 20 intermediate its ends and between the splines 18 and the end portion of the shaft coupled to a pumping element (not shown). Flange 20 forms a radially extending sealing surface 21 facing in a direction opposite to the pumping elements, which is operatively engaged by a radially extending bearing surface 22 formed on a thrust bearing ring 23 embracing a portion of the shaft and held in non-rotating relationship with the housing 12 by an anti-rotational pin 24 received in a slot 25 formed in the housing 12. Face 26 of the bearing ring opposite to the bearing surface 22 and facing in the same direction as the bearing surface 21 of the flange 20 engages a resilient concavo-convex wobble plate 27 having a centrally located aperture embracing the rotary shaft. Said wobble plate 27 is selected to be of sufficient resiliency to urge the bearing ring 23 by action of an apertured washer or disc-like stop means 28, one face of which engages part of side 30 of the wobble plate and the other face of which engages the inwardly terminal end 31 of the seal flange 15.

It can be seen that the whole wobble plate 27, being of concavo-convex configuration of sufficient resiliency to act in a spring-like manner and cooperating with the bearing ring 23 and flange 20, forms a universal joint assembly permitting limited universal rocker-like and limited axial action by the shaft thereby allowing for torque changes in the drive means and in the shaft normally occurring under operating conditions.

Shaft 17 is further provided with a reduced cylindrical section 32 located between the splines 18 and the flange 20 forming a radially extending seal bearing surface 33, facing in the same direction as bearing face 21 of flange 20, which cooperates with a radially extending bearing face 34 on seal bearing ring 35. Seal bearing ring is an apertured disc-like ring and is attached to and carried by one end of sealing bellows 36. The opposite end of sealing bellows 36 is suitably attached to and carried by the seal flange 15 in such a manner that the convolutions of the metallic bellows are compressed to urge the seal bearing ring 35 against the bearing face 33 of the shaft. Obviously the degree of compression of the bellows 36 is a matter of selection, dependent upon the force desired to urge seal bearing ring 35 against the sealing face 33, and, too, the end of the bellows shown attached to the seal flange 15, could be attached directly to the housing, if desired.

It can be seen from the above description that I have separated the thrust bearing universal joint-like assembly comprising the flange 20, bearing ring 23, wobble plate 27 and locking disc or stop means 28 upon which the main thrust loads are borne from the sealing assembly comprising the metallic sealing bellows 36, seal bearing rings 35 and sealing surface 33. In this manner a resiliently metallic bellows may be used, since no undue stress or strains are placed upon the bellows itself, which provides adequate seal for high temperature, corrosive fluids being pumped or handled between the drive shaft 17, and the stationary pumping housing 11.

It is to be understood that my invention in its broadest aspects consists of a sealing means for high temperature fluids between a stationary element and a rotary element. It is not to be limited to the specific type of pump or pumping housing; these being employed to facilitate description only.

Wherein the various parts of my invention have been referred to as located in a right or left or inward or outward position, it will be understood that this is done solely for the purpose of facilitating description and that such references relate only to the relative positions of the parts as shown in the accompanying drawing.

Also, it is to be understood that many changes and modification may be made without departing from the spirit and scope of my invention and the invention is designed and comprehended within the scope of the appended claims which should be given a scope consistent with the prior art.

I claim:

1. In a fluid seal between a housing and a rotary shaft having a first radially extending bearing face and a second radially extending bearing face; a first bearing ring having a radially extending surface engaging said first bearing surface; a second bearing ring having a radially extending surface engaging said second bearing surface; means including said second bearing ring and said bearing face defining a universal joint assembly normally engageable by and effective to provide for limited rocker-like action and axial movement of said shaft; means defining slot means in said housing; said second bearing ring having a portion received in said slot means in order to permit axial movement of said second bearing ring relative to said housing and prevent rotational movement thereof; and resilient sealing means biasing said first bearing ring against said first bearing face whereby a sealing relationship is maintained between said shaft and said housing.

2. In a fluid seal between a housing and a rotary shaft having a first radially extending bearing face and a second radially extending bearing face; a first bearing ring having a radially extending surface engaging said first bearing surface; a second bearing ring having a radially extending surface engaging said second bearing surface; means including said second bearing ring and said bearing face defining a universal joint assembly normally engageable by and effective to provide for limited rocker-like action and axial movement of said shaft; means defining slot means in said housing; said second bearing ring having a portion received in said slot means in order to permit axial movement of said second bearing ring relative to said housing and prevent rotational movement thereof; and resilient sealing means comprising a metallic bellows biasing said first bearing ring against said first bearing face whereby a sealing relationship is maintained between said shaft and said housing.

3. In a fluid seal between a housing and a rotary shaft having a first radially extending bearing face and a second radially extending bearing face; a first bearing ring having a radially extending surface engaging said first bearing surface; a second bearing ring having a radially extending surface engaging said second bearing surface; means including said second bearing ring, a resilient means, and said bearing face defining a universal joint assembly normally engageable by and effective to provide for limited rocker-like action and axial movement of said shaft; means defining slot means in said housing; said second bearing ring having a portion received in said slot means in order to permit axial movement of said second bearing ring relative to said housing and prevent rotational movement thereof; and resilient sealing means biasing said first bearing ring against said first bearing face whereby a sealing relationship is maintained between said shaft and said housing.

4. In a fluid seal between a housing and a rotary shaft having a first radially extending bearing face and a second radially extending bearing face; a first bearing ring having a radially extending surface engaging said first bearing surface; a second bearing ring having a radially extending surface engaging said second bearing surface; means including said second bearing ring, a resilient means, and said bearing face defining a universal joint assembly normally engageable by and effective to provide for limited rocker-like action and axial movement of said shaft; means defining slot means in said housing; said second bearing ring having a portion received in said slot means in order to permit axial movement of said second bearing ring relative to said housing and prevent rotational movement thereof; and resilient sealing means comprising a metallic bellows biasing said first bearing ring against said first bearing face whereby a sealing relationship is maintained between said shaft and said housing.

5. In a fluid seal arrangement for a shaft which extends through an opening of a housing, said shaft having a pair of radially extending bearing faces, a bellows embracing a portion of said shaft and having one end supported by said housing, a bearing ring carried by said bellows and embracing said shaft having a radially extending sealing face engageable against one of said radially extending faces on said shaft, said bearing ring being urged against said face by said bellows, a second bearing ring having a radially extending bearing surface embracing said shaft, means biasing said second bearing ring against the other of said bearing surfaces and permitting relative axial movement as well as variations in the positions of the axis of said shaft, means defining slot means in said housing, said second bearing ring having a portion received in said slot means in order to permit axial movement of said second bearing ring relative to said housing and prevent rotational movement thereof, said first bearing faces and said second bearing faces in cooperation with said bellows providing and maintaining a sealing relationship for rotating movement between said shaft and said housing.

6. In a fluid seal arrangement for a shaft which extends through an opening of a housing, said shaft having a pair of radially extending bearing faces, a bellows embracing a portion of said shaft and having one end supported by said housing, a bearing ring carried by said bellows and embracing said shaft having a radially extending sealing face engageable against one of said radially extending faces on said shaft, said bearing ring being urged against said face by said bellows, a second bearing ring having a radially extending bearing surface embracing said shaft, means comprising a resilient ring means biasing said second bearing ring against the other of said bearing surfaces and permitting relative axial movement as well as variations in the positions of the axis of said shaft, means defining slot means in said housing, said second bearing ring having a portion received in said slot means in order to permit axial movement of said second bearing ring relative to said housing and prevent rotational movement thereof, said first bearing faces and said second bearing faces in cooperation with said bellows providing and maintaining a sealing relationship for rotating movement between said shaft and said housing.

References Cited in the file of this patent

UNITED STATES PATENTS

| | | |
|---|---|---|
| 1,487,567 | Hill | Mar. 18, 1924 |
| 1,746,068 | Barnes | Feb. 4, 1930 |
| 1,866,967 | Durham | July 12, 1932 |
| 1,953,383 | Albertson | Apr. 3, 1934 |
| 1,998,790 | Potter | Apr. 23, 1935 |
| 2,438,457 | Schlosser | Mar. 23, 1948 |
| 2,444,249 | Estey | June 29, 1948 |
| 2,515,410 | Laas | July 18, 1950 |
| 2,747,901 | Clavell | May 29, 1956 |

FOREIGN PATENTS

| | | |
|---|---|---|
| 493,573 | Great Britain | Oct. 1, 1938 |